US007862417B2

(12) United States Patent
Nicely

(10) Patent No.: US 7,862,417 B2
(45) Date of Patent: Jan. 4, 2011

(54) CARD GAME ENABLING SEPARATE EVALUATIONS FOR MULTIPLE GAME OUTCOME COMBINATIONS

(75) Inventor: Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 12/569,199

(22) Filed: Sep. 29, 2009

(65) Prior Publication Data

US 2010/0016051 A1 Jan. 21, 2010

Related U.S. Application Data

(62) Division of application No. 11/222,203, filed on Sep. 8, 2005, now Pat. No. 7,614,946.

(60) Provisional application No. 60/610,237, filed on Sep. 15, 2004.

(51) Int. Cl.
*G06F 17/00* (2006.01)
*G06F 19/00* (2006.01)

(52) U.S. Cl. ............................. 463/13; 463/11; 463/12; 273/292

(58) Field of Classification Search ............. 463/11–13; 273/292
See application file for complete search history.

(56) References Cited

U.S. PATENT DOCUMENTS 2,228,180 A 1/1941 Pauli
2,474,573 A 6/1949 Cohen
3,589,729 A 6/1971 Girard
3,876,208 A 4/1975 Wachtler et al.
3,998,462 A 12/1976 Goott
4,648,604 A 3/1987 Horan
4,743,022 A 5/1988 Wood
4,861,041 A 8/1989 Jones et al.
4,948,128 A 8/1990 Emery, II et al.

(Continued)

OTHER PUBLICATIONS

"Double Handed High-Low", Hoyle's Modern Encyclopedia of Card Games, Walter B. Gibson, Doubleday & Company, Inc., p. 248 and pp. 228-234 (1974).

(Continued)

*Primary Examiner*—Peter DungBa Vo
*Assistant Examiner*—Milap Shah
(74) *Attorney, Agent, or Firm*—K&L Gates LLP

(57) ABSTRACT

A card game and method of playing the card game is disclosed. The card game involves placing cards into pre-defined card positions in the form of grids or matrices. For example, a 3×3 grid is filled with nine cards. Game outcome combinations are defined by three horizontal, three vertical and two diagonal pay lines. Another grid arrangement includes a 3×3 grid with each row and column having an extra card position at each end thereof. Accordingly, after the 3×3 grid is filled with random cards, a player may select one or more pay lines after which the two extra card positions are filled. The player is paid for any winning hands formed of the five card defined by the selected pay lines. Countless grid arrangements and pay lines are conceivable. In other versions, the player may replace one or more initially dealt, displayed or otherwise provided cards. The card game and method disclosed herein may be played through an electronic gaming device, over the Internet or at a live gaming table with a dealer.

12 Claims, 16 Drawing Sheets

U.S. PATENT DOCUMENTS 4,948,134 A 8/1990 Suttle et al.
5,014,988 A 5/1991 Mirando et al.
5,019,973 A 5/1991 Wilcox et al.
5,022,653 A 6/1991 Suttle et al.
5,033,744 A 7/1991 Bridgeman et al.
5,042,818 A 8/1991 Weingardt
5,098,107 A 3/1992 Boylan et al.
5,100,137 A 3/1992 Fulton
5,100,139 A * 3/1992 Di Bella ..................... 273/292
5,118,109 A 6/1992 Gumina
5,118,114 A 6/1992 Tucci
5,154,429 A 10/1992 LeVasseur
5,165,693 A 11/1992 Handlon, Sr.
5,167,413 A 12/1992 Fulton
5,188,363 A 2/1993 Marnell, II et al.
5,248,142 A 9/1993 Breeding
5,251,897 A 10/1993 Fulton
5,255,915 A 10/1993 Miller
5,265,882 A 11/1993 Malek
5,277,424 A 1/1994 Wilms
5,280,915 A 1/1994 Grossman
5,286,023 A 2/1994 Wood
5,288,081 A 2/1994 Breeding
5,294,120 A 3/1994 Schultz
5,303,929 A 4/1994 Sandeen
5,308,065 A 5/1994 Bridgeman
5,320,356 A 6/1994 Cauda
5,328,189 A 7/1994 Malek
5,332,219 A 7/1994 Marnell et al.
5,342,047 A 8/1994 Heidel et al.
5,356,140 A 10/1994 Dabrowski et al.
5,377,993 A 1/1995 Josephs
5,382,025 A 1/1995 Sklansky et al.
5,407,209 A * 4/1995 Prerost ....................... 273/292
5,411,257 A 5/1995 Fulton
5,415,404 A 5/1995 Joshi et al.
5,417,430 A 5/1995 Breeding
5,437,451 A 8/1995 Fulton
5,451,054 A 9/1995 Orenstein
5,452,899 A 9/1995 Skratulia et al.
5,486,005 A 1/1996 Neal
5,489,101 A 2/1996 Moody
5,496,038 A 3/1996 Kangsanaraks
5,531,440 A 7/1996 Dabrowski et al.
5,531,441 A 7/1996 Dabrowski et al.
5,531,448 A 7/1996 Moody
5,542,669 A 8/1996 Charron et al.
5,544,892 A 8/1996 Breeding
5,570,885 A 11/1996 Ornstein
5,573,249 A 11/1996 Johnson
5,577,731 A 11/1996 Jones
5,580,053 A 12/1996 Crouch
5,630,753 A 5/1997 Fuchs
5,639,092 A 6/1997 Macaisa
5,653,140 A 8/1997 Dabrowski et al.
5,664,781 A 9/1997 Feola
5,722,891 A 3/1998 Inoue
5,725,428 A 3/1998 Achmuller
5,732,950 A 3/1998 Moody
5,743,530 A 4/1998 Sklad et al.
5,743,799 A 4/1998 Houriet, Jr. et al.
5,779,549 A 7/1998 Walker et al.
5,807,172 A 9/1998 Piechowiak
5,813,911 A 9/1998 Margolin
5,816,915 A 10/1998 Kadlic
5,816,916 A 10/1998 Moody
5,820,460 A 10/1998 Fulton
5,823,873 A 10/1998 Moody
5,839,732 A 11/1998 Guidi
5,845,907 A 12/1998 Wells
5,868,618 A 2/1999 Netley et al.
5,868,619 A 2/1999 Wood et al.
5,879,233 A 3/1999 Stupero
5,882,259 A 3/1999 Holmes et al.
5,882,260 A 3/1999 Marks et al.
5,885,158 A 3/1999 Torango et al.
5,897,436 A 4/1999 Singer et al.
5,908,353 A 6/1999 Andrews
5,909,875 A 6/1999 Weingardt
5,911,419 A 6/1999 Delaney et al.
5,921,550 A 7/1999 Awada
5,934,675 A 8/1999 Handelman et al.
5,947,821 A 9/1999 Stone
5,947,822 A 9/1999 Weiss
5,951,012 A 9/1999 Feola
5,954,335 A 9/1999 Moody
5,964,464 A 10/1999 Jones
5,971,849 A 10/1999 Falciglia
5,975,529 A 11/1999 de Keller
5,976,016 A 11/1999 Moody et al.
5,988,643 A 11/1999 Awada
5,997,002 A 12/1999 Goldman
6,007,066 A 12/1999 Moody
6,007,424 A 12/1999 Evers et al.
6,012,719 A 1/2000 Webb
6,012,720 A 1/2000 Webb
6,019,374 A 2/2000 Breeding
6,045,129 A 4/2000 Cooper et al.
6,048,267 A 4/2000 Wichinsky
6,050,568 A 4/2000 Hachquet
6,056,641 A 5/2000 Webb
6,062,980 A 5/2000 Luciano
6,079,710 A 6/2000 Brown
6,079,711 A 6/2000 Wei et al.
6,089,978 A 7/2000 Adams
6,093,100 A 7/2000 Singer et al.
6,098,985 A 8/2000 Moody
6,102,400 A 8/2000 Scott et al.
6,110,040 A 8/2000 Sanduski et al.
6,120,378 A 9/2000 Moody et al.
6,129,357 A 10/2000 Wichinsky
6,131,907 A 10/2000 Nucifora et al.
6,131,908 A 10/2000 Palmer
6,132,311 A 10/2000 Williams
6,135,882 A 10/2000 Kadlic
6,135,883 A 10/2000 Hachquet
6,146,271 A 11/2000 Kadlic
6,149,156 A 11/2000 Feola
6,149,157 A 11/2000 Saun
6,149,521 A 11/2000 Sanduski
6,159,095 A 12/2000 Frohm et al.
6,168,521 B1 1/2001 Luciano et al.
6,173,955 B1 1/2001 Perrie et al.
6,176,781 B1 1/2001 Walker et al.
6,206,374 B1 3/2001 Jones
6,206,780 B1 3/2001 Awada
6,220,959 B1 4/2001 Holmes, Jr. et al.
6,227,969 B1 5/2001 Yoseloff
6,237,916 B1 5/2001 Webb
6,241,607 B1 6/2001 Payne et al.
6,247,697 B1 * 6/2001 Jewett ........................ 273/292
6,248,016 B1 6/2001 Walker et al.
6,257,979 B1 7/2001 Walker et al.
6,270,078 B1 8/2001 Leone et al.
6,270,079 B1 8/2001 Chamberlain
6,270,405 B1 8/2001 Ferguson
RE37,414 E 10/2001 Harlick
6,299,532 B1 10/2001 Smith
6,305,686 B1 10/2001 Perrie et al.
6,311,978 B1 11/2001 Moody
6,315,291 B1 11/2001 Moody
6,322,445 B1 11/2001 Miller
6,332,614 B1 12/2001 Hesse
6,332,839 B2 12/2001 Walker et al.

6,334,613 B1 1/2002 Yoseloff
6,334,614 B1 1/2002 Breeding
6,336,859 B2 1/2002 Jones et al.
6,342,007 B1 1/2002 Wood et al.
6,345,823 B1 2/2002 Webb
6,358,144 B1 3/2002 Kadlic et al.
6,364,313 B1 4/2002 Moody
6,371,851 B1 4/2002 Singer et al.
6,402,150 B1 6/2002 Jones
6,405,174 B1 6/2002 Walker et al.
6,406,023 B1 6/2002 Rowe
6,409,173 B1 6/2002 Tri
6,409,174 B1 6/2002 Demarest
6,416,407 B1 7/2002 Carrico et al.
6,419,578 B1 7/2002 Moody et al.
6,428,002 B1 8/2002 Baranauskas
6,435,506 B1 8/2002 Piccoli
6,443,456 B1 9/2002 Gajor
6,461,240 B1 10/2002 Perkins
6,478,675 B1 11/2002 Awada
6,485,366 B1 * 11/2002 Rowe .......................... 463/13
6,506,116 B1 1/2003 Sunaga et al.
6,511,068 B1 1/2003 Sklansky et al.
6,517,074 B1 2/2003 Moody et al.
6,533,658 B1 3/2003 Walker et al.
6,537,150 B1 3/2003 Luciano et al.
6,561,898 B2 5/2003 Moody
6,568,680 B1 5/2003 Moody et al.
6,595,520 B1 7/2003 Richards et al.
6,637,746 B1 * 10/2003 Baranauskas ............... 273/292
6,652,377 B1 11/2003 Moody
6,672,959 B2 1/2004 Moody et al.
6,676,511 B2 1/2004 Payne et al.
6,695,695 B2 2/2004 Angel
6,923,446 B2 8/2005 Snow
6,955,356 B2 10/2005 Moody
6,959,928 B2 11/2005 Schultz
6,964,418 B2 11/2005 Moody
7,000,921 B2 2/2006 Schultz
7,044,468 B2 5/2006 Sklansky et al.
7,137,883 B1 * 11/2006 Falciglia, Sr. ................ 463/13
7,222,857 B2 5/2007 Moody
7,222,858 B2 5/2007 Moody
7,258,342 B2 8/2007 Loewenstein et al.
7,431,643 B2 10/2008 Dargue
7,506,873 B1 3/2009 Barrie
7,614,946 B2 * 11/2009 Nicely ......................... 463/13
2001/0041610 A1 11/2001 Luciano et al.
2002/0074725 A1 6/2002 Stern
2002/0082069 A1 6/2002 Parker
2002/0187823 A1 12/2002 Khal
2002/0190469 A1 12/2002 Conklin et al.
2003/0069055 A1 4/2003 Moody
2003/0073476 A1 4/2003 Friedman
2003/0130024 A1 7/2003 Darby
2003/0162424 A1 8/2003 Berman
2004/0033824 A1 2/2004 Fitzhugh
2004/0130023 A1 7/2004 Naiki
2004/0188938 A1 9/2004 Moody et al.
2005/0037834 A1 * 2/2005 Stern et al. .................... 463/20
2005/0121853 A1 * 6/2005 Patelidas .................... 273/292
2005/0239527 A1 10/2005 Moody
2005/0239528 A1 10/2005 Moody
2006/0154714 A1 7/2006 Montross et al.
2006/0211468 A1 * 9/2006 Flint et al. .................... 463/16
2007/0111782 A1 * 5/2007 Adams et al. ................. 463/17
2007/0178965 A1 8/2007 Inoue

OTHER PUBLICATIONS

Double up Poker Game Description written by IGT, available prior to Sep. 2000.
Foster, R.F., Hoyle: An Encyclopedia of Indoor Games, pp. 182-183 (1853-1945).
Morehead et al., "Description of Poker,"; "Description of Hold'em Poker," Hoyle's Rules of Games, Second Revised Edition, pp. 34-63 and pp. 47-48 (1983).
Morehead et al., "Description of Poker,"; "Description of Hold'em Poker," Official Rules of Card Games, 53rd Edition, pp. 64-97 and pp. 78-79 (1963).
Pai gow poker description [online] [printed on Jan. 15, 2007]. Retrieved from the Internet at <URL: http://en.wikipedia.org/wiki/Pai_gow_poker>.
Scarne's New Complete Guide to Gambling, written by John Scarne, published by Simon & Schuster, Inc., pp. 490-499 (1974).
Scarne's Encyclopedia of Card Games, written by John Scarne, published by HarperCollins Publishers, Inc., 278-279 (1973).
Wheel Poker Article, written by Strictly Slots, published prior to 2002.

* cited by examiner

CARD GAME ENABLING SEPARATE EVALUATIONS FOR MULTIPLE GAME OUTCOME COMBINATIONS

PRIORITY CLAIM

This application is a divisional of, claims priority to and claims the benefit of U.S. patent application Ser. No. 11/222,203 filed on Sep. 8, 2005 and issued as U.S. Pat. No. 7,614,946 on Nov. 10, 2009, which is a non-provisional of, claims priority to and the benefit of U.S. Provisional Patent Application Ser. No. 60/610,237 filed on Sep. 15, 2004, the entire contents of which are incorporated herein by reference.

FIELD OF THE INVENTION

The embodiments of the present invention relate to card-based casino games facilitated by electronic gaming devices, the Internet and live tables. More particularly, the embodiments relate to methods and systems providing for a card game wherein cards are provided to fill predefined card positions such that a multiplicity of possible outcomes and payouts are available.

BACKGROUND

There are a vast multitude of casino card games. Some card games, like Caribbean Stud Poker, Three Card Poker, Let It Ride and 3-5-7 Poker are stud games insofar as the game outcomes are based solely on the originally dealt cards. Other card games, like video poker and variations thereof, are draw games wherein the player has the opportunity to replace at least one originally dealt card in order to improve the game outcome. Depending on the game, the player may be allowed to replace all the original cards, only certain cards, only a certain number of cards, etc.

Some casino stud games also involve a dealer hand and/or require the player to make betting decisions before all game cards are revealed or dealt. For example, in Caribbean Stud Poker and Three Card Poker, the player is required to increase his or her wager in order to continue play and for comparison of the player's revealed hand to the dealer's revealed hand.

Other casino stud games do not involve a dealer hand while still other casino stud games offer the player the ability, but do not require the player, to modify his or her wager. For example, in Let It Ride, the player is offered the ability to reduce his or her wager before all of the game cards have been revealed. In 3-5-7 Poker and some blackjack games, the player is given the opportunity to surrender his or her hand thereby forfeiting one-half of his or her initial wager.

There are also casino slot machines which produce outcomes consisting of symbols arranged in a pattern with pay lines identifying certain combinations of symbols in the pattern. A winning outcome occurs when certain symbols align along an active pay line in accordance with the pay table for the game. Slot machines with multiple pay lines are often configured to activate pay lines on which the player has placed a wager. At least one game, Spin Poker, offers a video poker variation which depicts card symbols appearing on spinning reels.

In other casino slot machines, like the Bananarama With Bonus slot machine game, the vertical arrangement of symbols is fixed along a video reel where a portion of the reel is randomly selected, usually by a pay line, to generate the game outcome. Typically with such games, one symbol from each reel may align with a pay line. In other casino slot machines, like Vacation USA slot machine, each symbol location is independently selected. In such games, any combination of symbols, including multiple symbols from a single reel, may align along a pay line.

SUMMARY

The embodiments of the present invention include a method and device for conducting a casino card game with the some or all of the following features:

- a play grid for receiving game cards;
- one or more pay lines placed on the play grid for defining unique card combinations forming a hand;
- ability to accept wager(s) which activate one or more pay lines;
- providing an initial card to each grid position;
- allowing the player to replace at least one card in an attempt to improve the game outcome; and
- evaluating the outcome for each active pay line and for each winning outcome, paying the player a corresponding award.

The embodiments of the present invention also include any number of variations of pay line configurations including, but not limited to, configurations wherein:

- each card is subject to one pay line;
- some or all cards are subject to two or more pay lines;
- all pay lines are in the form of straight lines;
- some or all pay lines are in a form other than a straight line;
- all pay lines intersect the same number of cards; and
- one or more pay lines intersect a different number of cards than at least one other pay line.

With respect to games having pay lines intersecting different numbers of cards, there may be different pay criteria based upon the number of cards intersected. Pay criteria may also include providing special pay awards for game outcomes utilizing all, or a majority, of the cards in the grid. For example, a special pay out may be provided if K or more of the N cards in the grid (where $K \leqq N$) are of the same suit. In such a game, a pay table may be configured such that the larger the number of cards of the same suit, wherein the number is at or above the K threshold, the larger the award. Another example is an award corresponding to a pay line intersecting final cards in the grid forming an N-card straight, N-card flush or an N-card straight flush. Such special pays may be available as a general bonus of the game or, in an alternate game configuration, may be in the form of a side bet that the player can place.

Alternately, or additionally, a special bonus award may be offered that provides the player an award based upon a combination of outcomes identified by multiple pay lines. For example, if the player obtains a winning outcome on all active pay lines, a bonus award may be defined that awards the player twice the normal amount for each award. Another example comprises a special award in response to the player obtaining a losing outcome identified by all active pay lines.

Likewise, the embodiments of the present invention contemplate any and all grid arrangement variations including, but not limited to:

- T-shaped;
- X-shaped;
- 2D square grid;
- 2D rectangular grid;
- 2D pyramid;
- other 2D arrangements, such as a snowflake pattern; or
- 3D cube or other 3D arrangements.

The embodiments of the present invention contemplate any variation of wagering requirements including, but not limited to:

no minimum wager restrictions;

to activate a pay line, a wager must be placed thereon;

all pay lines must have the same sized wager placed thereon; or the player places a single wager to activate a group of pay lines.

In other game variations, the player is allowed to replace more than one card. Players may be required to select and replace all of the cards at once or may be allowed to select and replace cards individually. In the latter case, the game may be configured such that the player may or may not be allowed to replace a card position more than once during the game.

The games offered under the embodiments of the present invention may be conducted with one or more decks of cards. Similarly, a deck may or may not include Jokers which may be used as a wild card, or alternately may be used in a manner according to the rules of Pai Gow poker. Alternately or additionally, one or more non-Joker cards may be designated as a wild card. With games having wild cards and grid positions intersected by multiple pay lines, the wild card may be evaluated differently for each pay line in order to optimize the player's outcome for each pay line. Alternately, the player may be required to select a single value for a wild card that is the single value applied regardless of the subject pay line. With games played with more than one deck of cards and/or wild cards, special payouts may be defined for outcomes where an outcome includes a certain number of the same card and suit.

Other variations, embodiments and features of the present invention will become evident from the following detailed description, drawings and claims.

DETAILED DESCRIPTION

Figure 1:
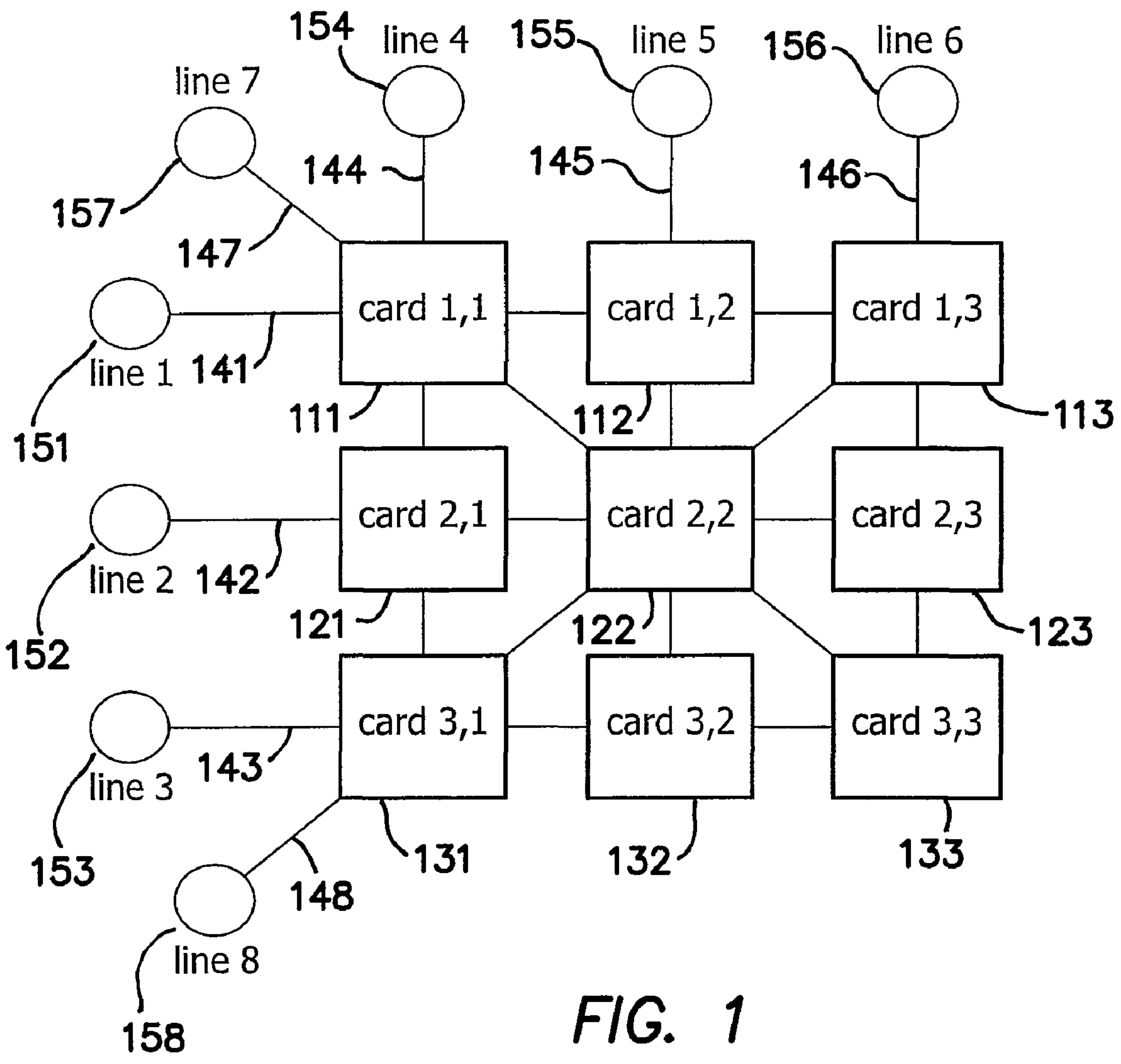
FIG. 1 shows a 3×3 grid incorporating eight pay lines and multiple wagering areas.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are ideal for video-based and Internet based applications. Therefore, the following description focuses on such applications. However, it should be noted that live applications are conceivable and within the spirit and scope of the present invention. The operation of gaming devices, Internet-based applications and live table games are well known in the art and need not be explained in great detail herein. Necessary details are noted as necessary.

Now referring to the drawings, FIG. 1 shows an example of a first embodiment of the present invention having a 3×3 square grid comprising card positions 111-113, 121-123 and 131-133 intersected by eight straight pay lines 141-148. Specifically, there are three horizontal pay lines 141-143, three vertical pay lines 144-146 and two diagonal pay lines 147, 148. As an example of a pay line arrangement, pay line 141 corresponds to the card positions 111, 112, and 113 for receiving cards 1,1; 1,2 and 1,3 respectively. At ends of each pay line 141-148 are wager areas 151-158 corresponding to that pay line. Game rules may include additional wagering requirements such as requiring a wager in all wager areas 151-158 to activate all pay lines 141-148, the same size wager placed in each wager area 151-158, etc.

Figure 2:
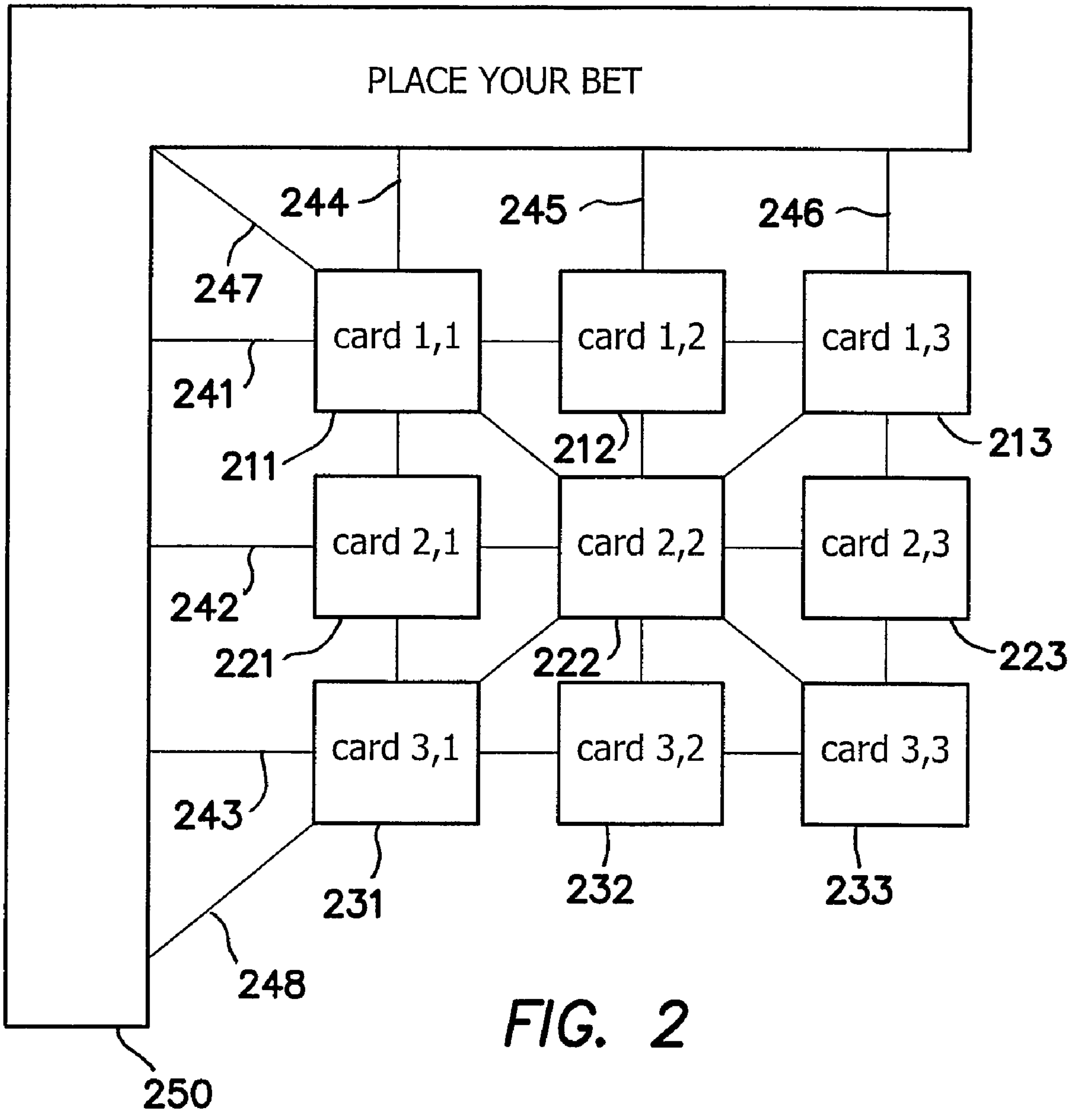
FIG. 2 shows a 3×3 grid incorporating eight pay lines and one global wager area.

FIG. 2 is similar to FIG. 1 insofar as it also depicts a sample game comprising a 3×3 square grid of card positions 211-213, 221-223 and 231-233 and eight straight pay lines 241-248. However, FIG. 2 incorporates a single wager area 250 for placement of a single wager that activates all of the pay lines 241-248.

Figure 3:
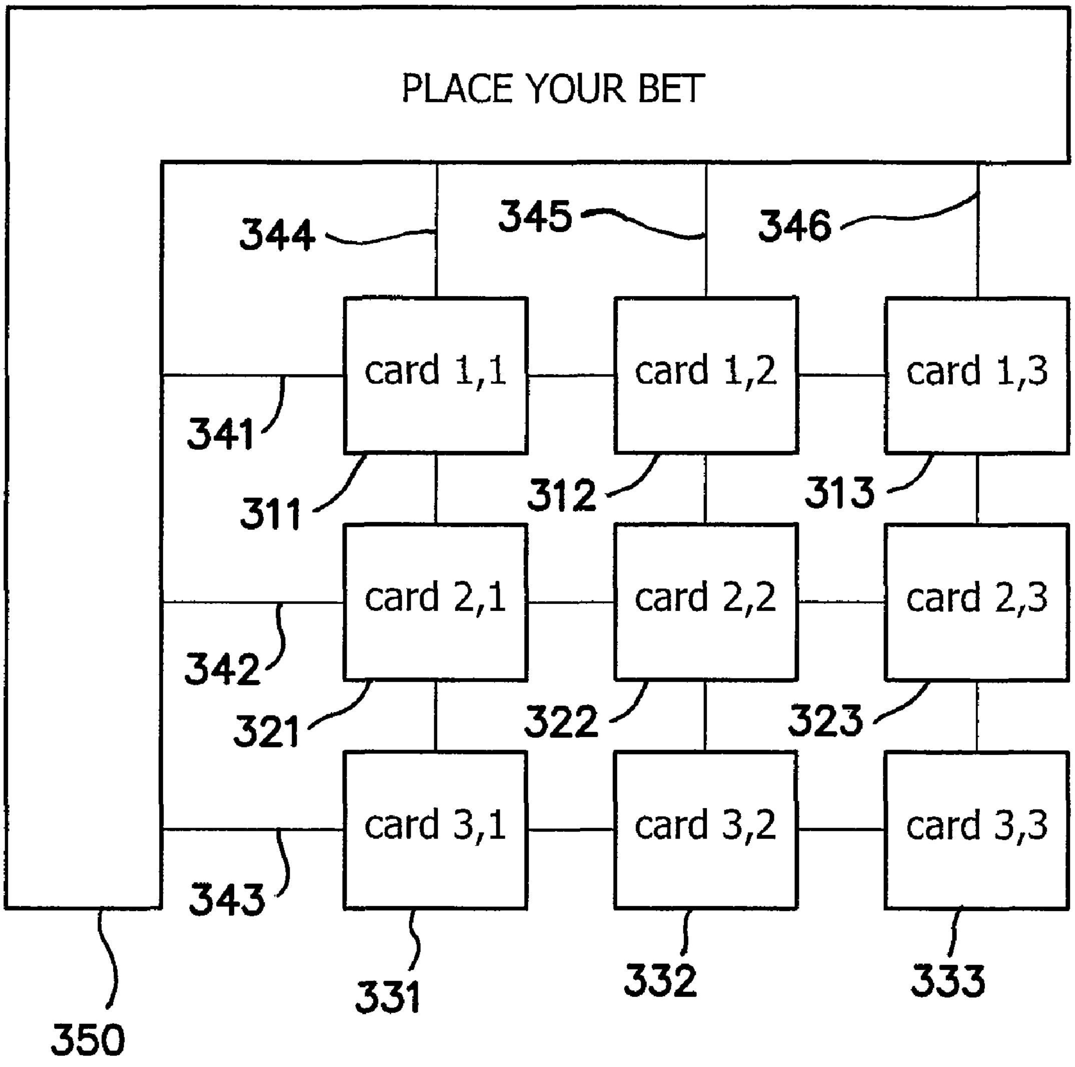
FIG. 3 shows a 3×3 grid incorporating three vertical pay lines and three horizontal pay lines.

FIG. 3 is similar to FIG. 2 insofar as it also depicts a sample game comprising a 3×3 square grid of card positions 311-313, 321-323 and 331-333 and a single wagering area 350. However, the game has a varied arrangement of pay lines. Specifically, the game comprises only three horizontal pay lines 341-343 and three vertical pay lines 344-346. That is, there are no diagonal pay lines as set forth in FIGS. 1 and 2.

Figure 4:
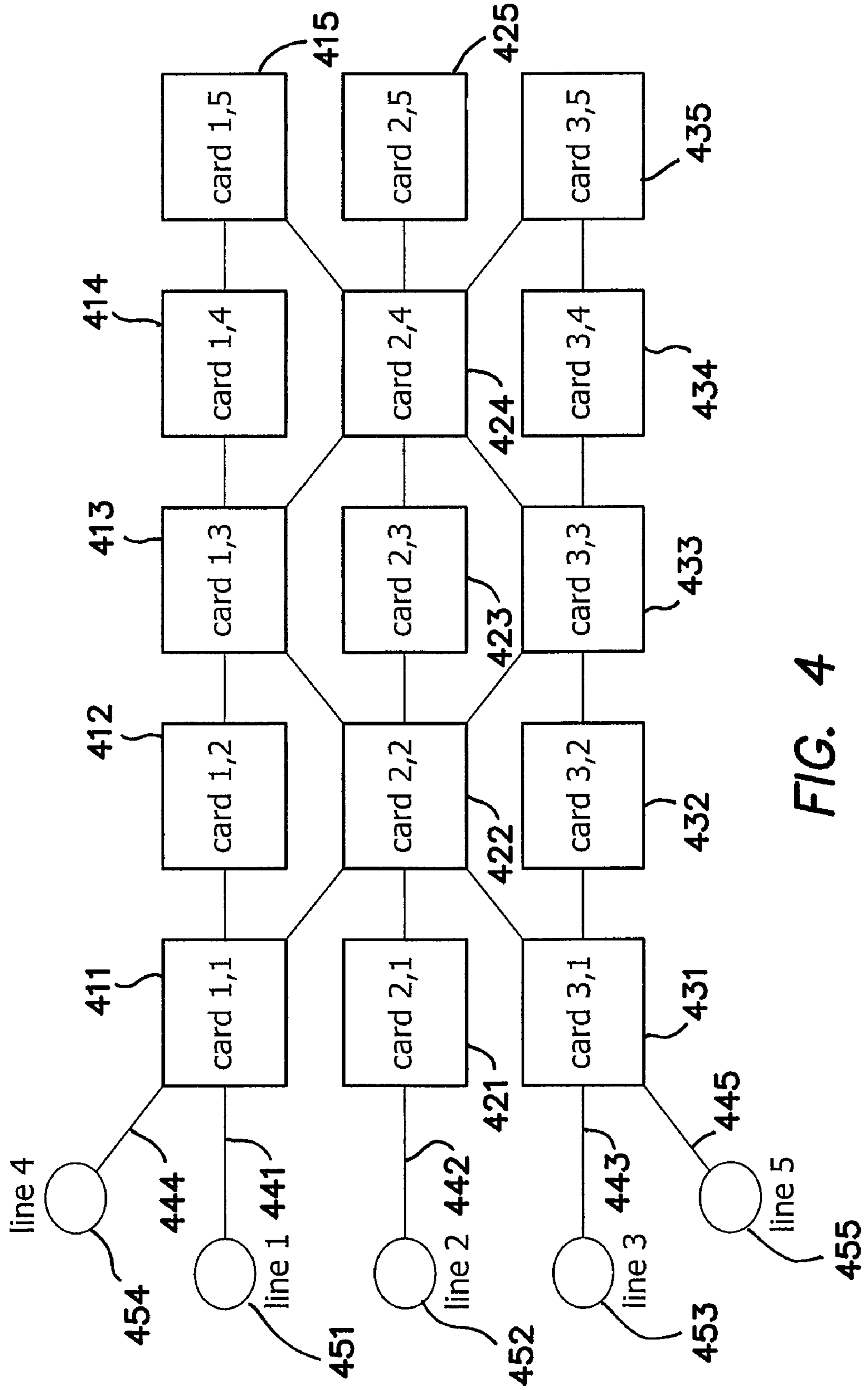
FIG. 4 shows a 3×5 grid incorporating five pay lines.

FIG. 4 depicts another grid arrangement comprising a 3×5 rectangular grid of card positions 411-415, 421-425 and 431-435 intersected by five pay lines 451-455. Each pay line 451-455 intersects five card positions which generate a game outcome for which game awards may be paid. First, there are three straight horizontal pay lines 441-443. For example, Pay line 441 intersects card positions 411, 412, 413, 414 and 415 which receive cards 1,1; 1,2; 1,3; 1,4 and 1,5 respectively. There are also two angled pay lines 444 and 445. Pay line 444 intersects card positions 411, 422, 433, 424 and 415 which receive cards 1,2; 2,2; 3,3; 2,4 and 1,5. Pay line 445 intersect card positions 431, 422, 413, 424 and 435 which receive cards 3,1; 2,2; 1,3; 2,4 and 3,5 respectively. This card position arrangement creates a situation wherein multiple card positions are intersected by multiple pay lines. As shown in FIG. 4, card positions 411, 413, 415, 422, 424, 431, 433 and 435 which receive cards 1,1; 1,3; 1,5; 2,2; 2,4; 3,1; 3,3 and 3,5 respectively are each intersected by multiple pay lines while the other card positions are only intersected by a single pay line.

Figure 5:
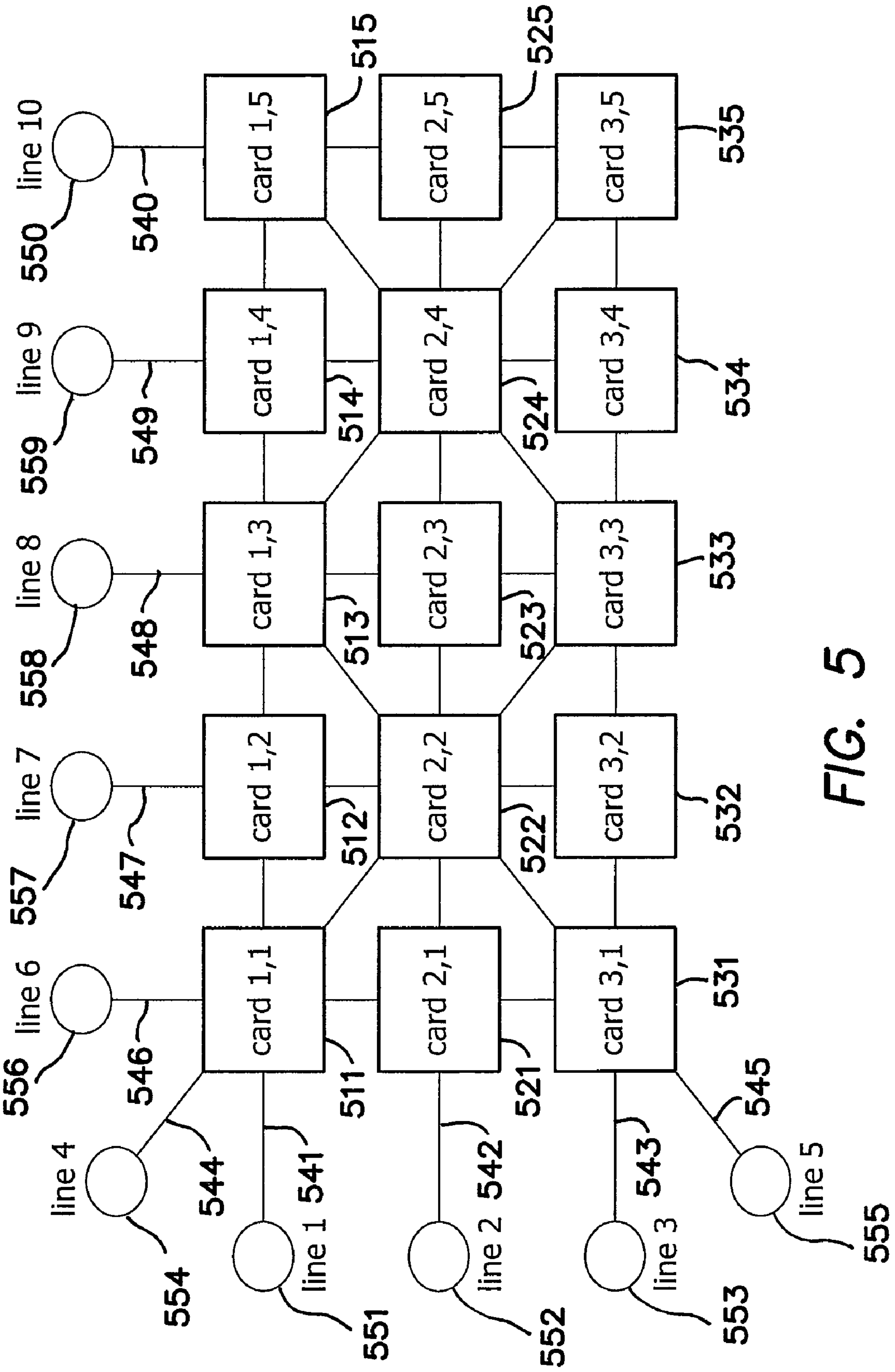
FIG. 5 shows a 5×5 grid incorporating ten pay lines.

FIG. 5 is similar to FIG. 4 in that the grid arrangement comprises a 3×5 rectangular grid of card positions 511-515, 521-525 and 531-535 intersected by five pay lines 551-555. However, the grid shown in FIG. 5 further incorporates five vertical pay lines 550, 556-559 which each intersect three card positions. This card position arrangement creates a situation wherein individual pay lines, in a single game, intersect different numbers of card positions and cards, respectively.

Figure 6:
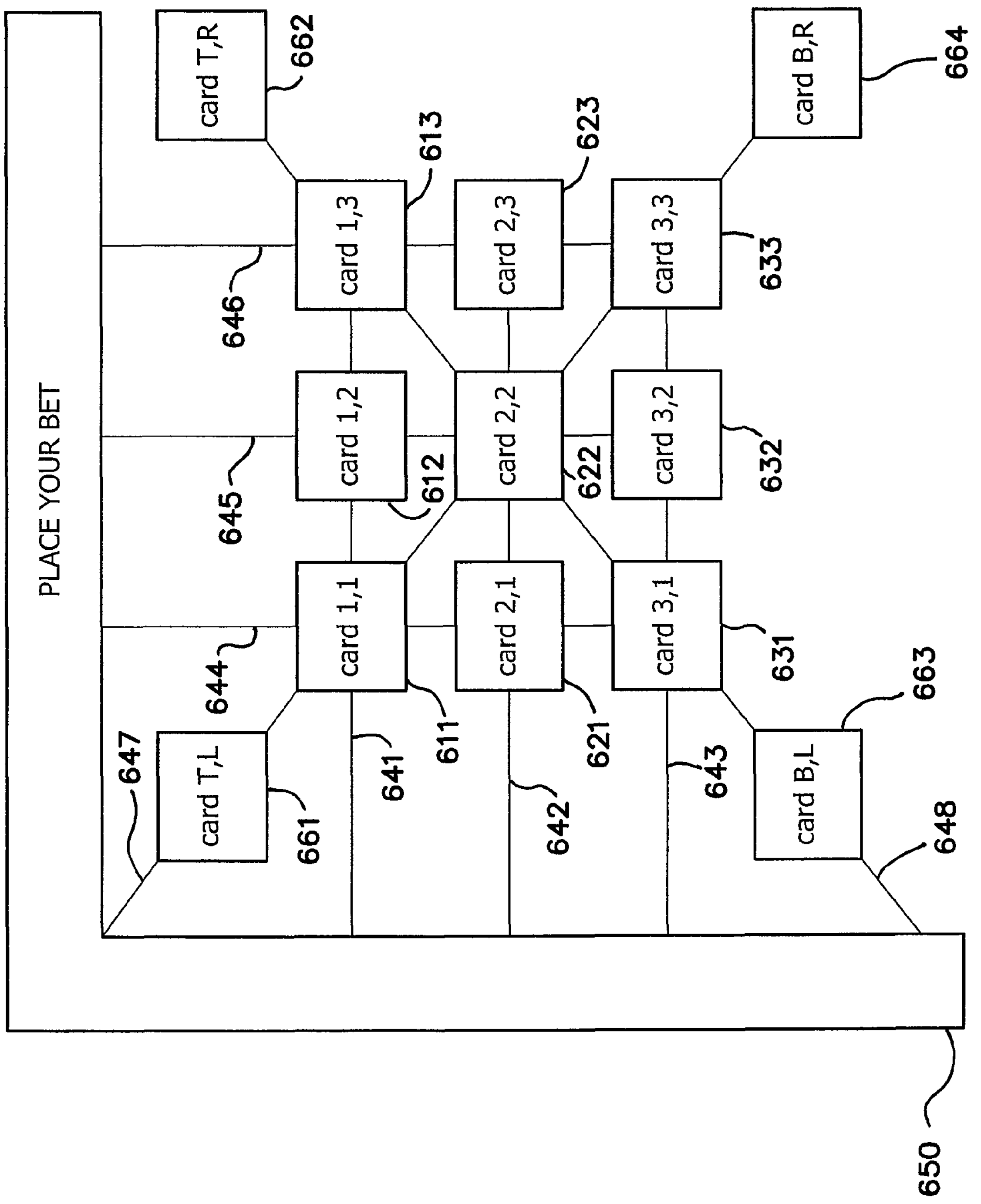
FIG. 6 shows a non-rectangular grid incorporating multiple pay lines.

FIG. 6 depicts a non-rectangular grid arrangement. The non-rectangular grid comprises three horizontal pay lines 641-643, each intersecting three card positions 611-613, 621-623 and 631-633, respectively, three vertical pay lines 644-646, each intersecting three card positions 611, 621, 631; 612, 622, 632; and 613, 623, 633, respectively, and two diagonal pay lines 647 and 648 each intersecting five card positions 661, 611, 622, 633, 664 and 662, 613, 622, 631, 663, respectively.

Figure 7:
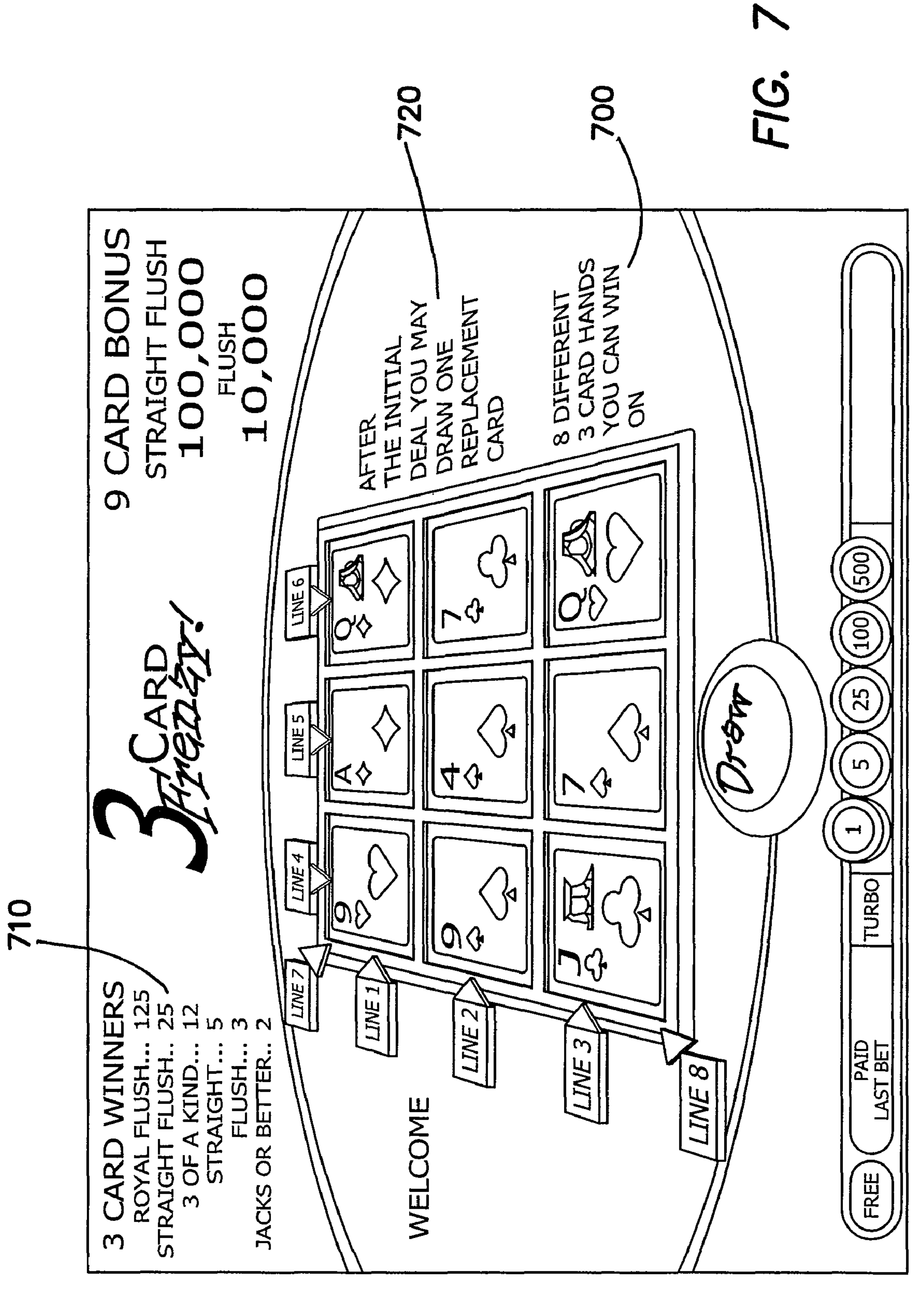
FIG. 7 shows a sample implementation of a game having a 3×3 grid.

FIG. 7 depicts a screen shot from an electronic embodiment of the present invention implemented as a video game or Internet-based game. The screen displays a 3×3 grid 700, pay table 710 and game rules 720. Furthermore, the grid 700 displayed in FIG. 7 is synonymous with an arrangement that may be implemented as a live table game using an electronic display or physical cards. Indeed, the embodiments of the present invention include depicting the grid on a table felt in a conventional manner using ink. Alternately, or additionally, the card positions may be defined by raised partitions and/or depressions in the table such that the cards are retained in place. Furthermore, with such partitions, it is possible to incorporate a card collector into which the cards drop when the game ends and that may optionally funnel the cards into a card shuffler.

Figure 8:
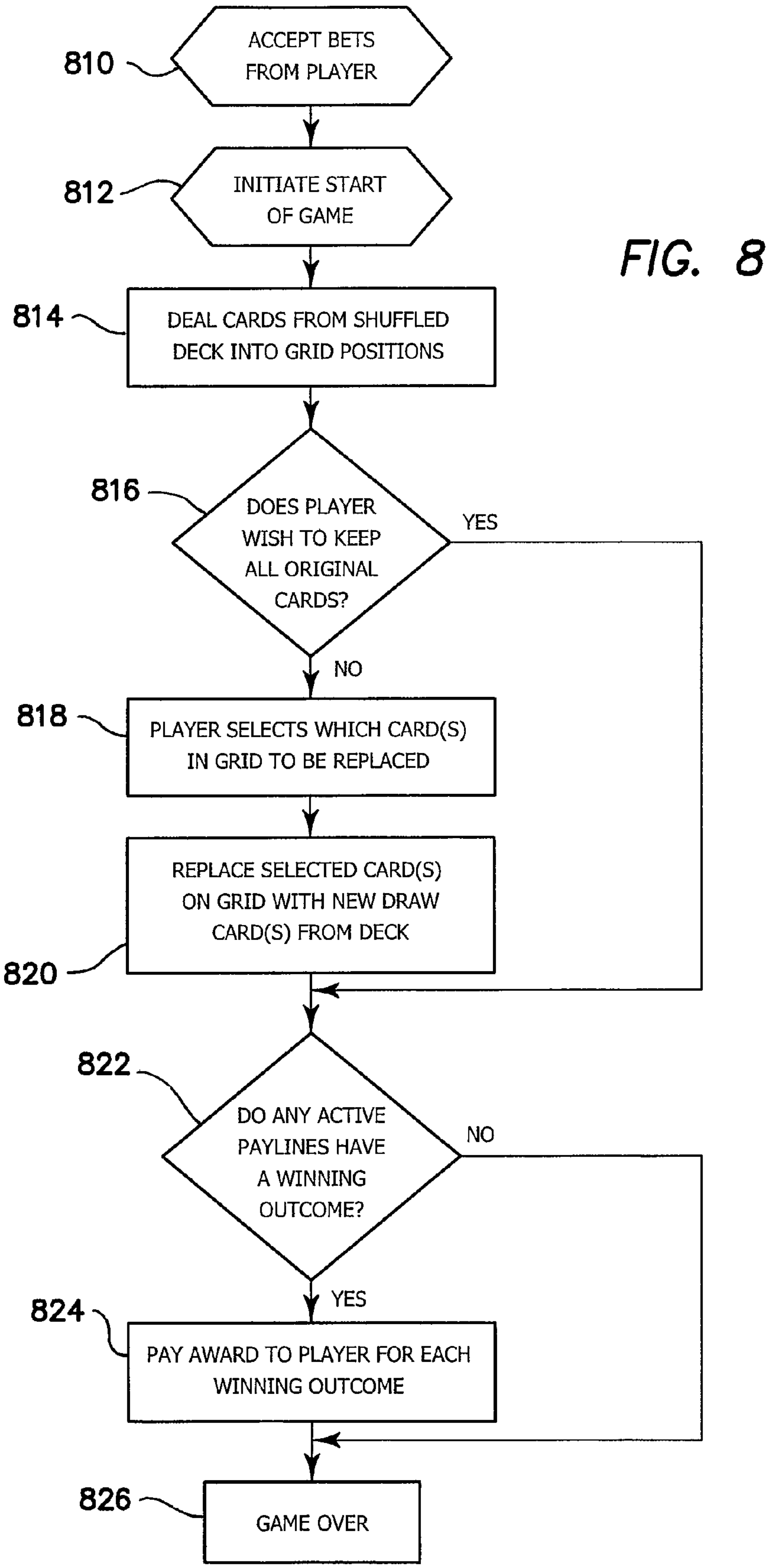
FIG. 8 shows a block diagram of a game wherein a player may replace cards once.

FIG. 8 shows a block diagram detailing one embodiment of the present invention, namely a game where the replacement cards are selected by the player one at a time. The block diagram shows acceptance of player wager 810 and the activation the game 812 which triggers random cards being dealt, displayed or otherwise provided 814 to fill each card position of the game's card grid. The player then decides whether to hold all the initial cards 816 or to discard certain card(s) 818 to be replaced with new random card(s) from the deck. At 820 replacement or draw card(s) are dealt, displayed or otherwise provided to each position selected by the player. Once all requested draw cards have been dealt, displayed or otherwise provided, the game outcome along each active pay line is examined 822 and for each winning outcome, the player is paid an award 824 relative to a pay table which defines the award amount for the given outcome and wager amount.

It should be noted that other embodiments cover a game including all of the steps shown in FIG. 8 except the step of rendering the card draw 816 optional. In such an implementation, the player must always select the card(s) to be replaced. The actual number of possible replacement cards is defined by the game and includes games wherein only one card may be replaced.

Figure 9:
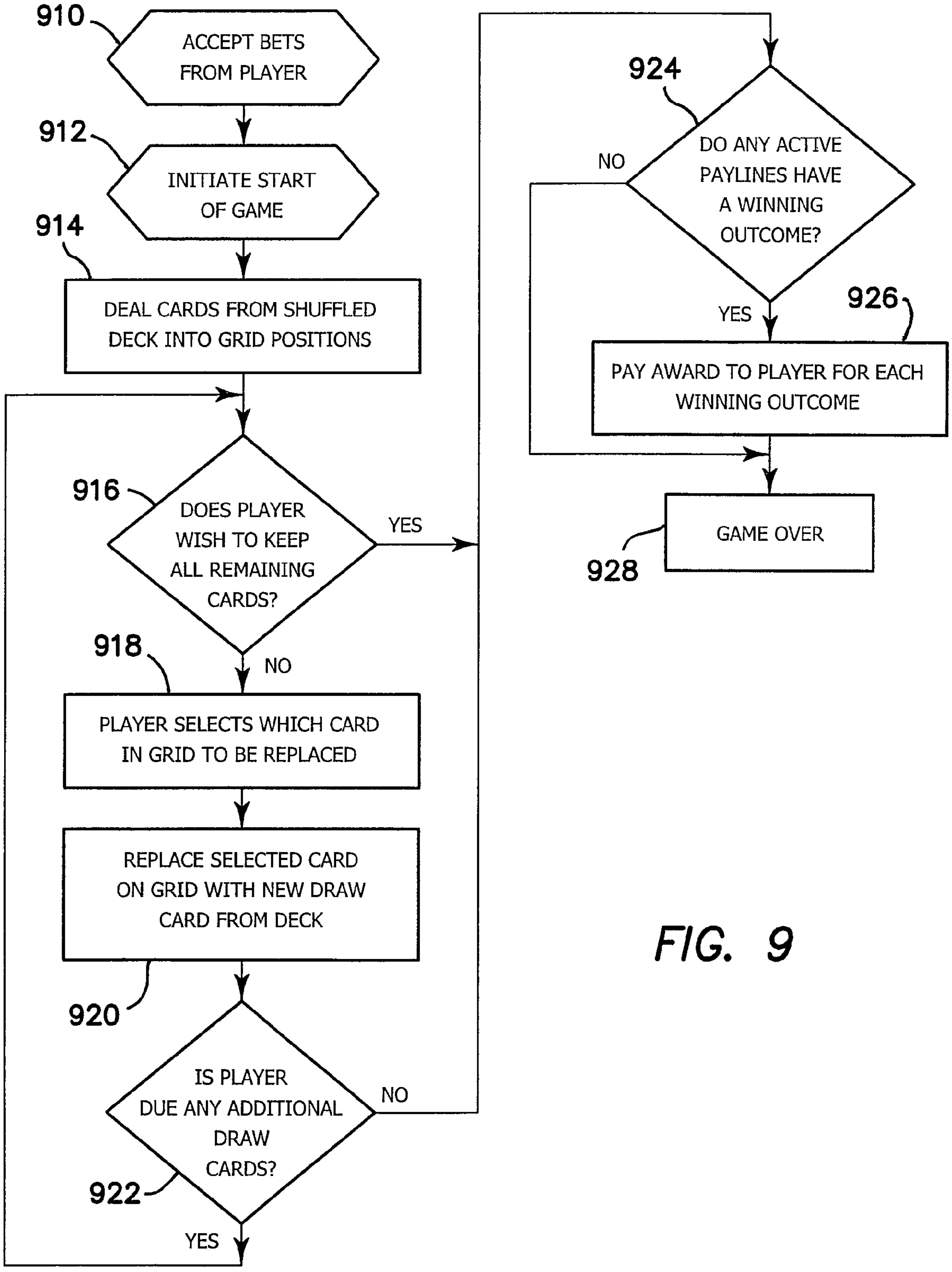
FIG. 9 shows a block diagram of a game wherein players may replace cards sequentially.

FIG. 9 shows a block diagram detailing a second embodiment of the present invention, namely a game incorporating means for a player to replace sequentially one or more cards. As with FIG. 8, a player wager is accepted 910, the game is activated 912 and the initial random cards are dealt, displayed or otherwise provided to their respective card positions 914 on the game grid. The player may hold 916 his or her initial set of cards or may select 918 a single card to be replaced 920 with a new card from the deck. For a second time, the player is able to select 918 a single card to be replaced 920 with a new card from the deck. Depending on the game, the player may be able to continue replacing cards until the no more replacement cards are available 922. Further, game rules may or may not be defined to restrict the card selection. For example, game rules may be defined to allow a player to select each card position for card replacement only once during a game. As with FIG. 8, after all draw cards have been dealt, displayed or otherwise provided, each pay line is examined 924 and winning outcomes are paid 926 before the game is ends 928.

Figure 10:
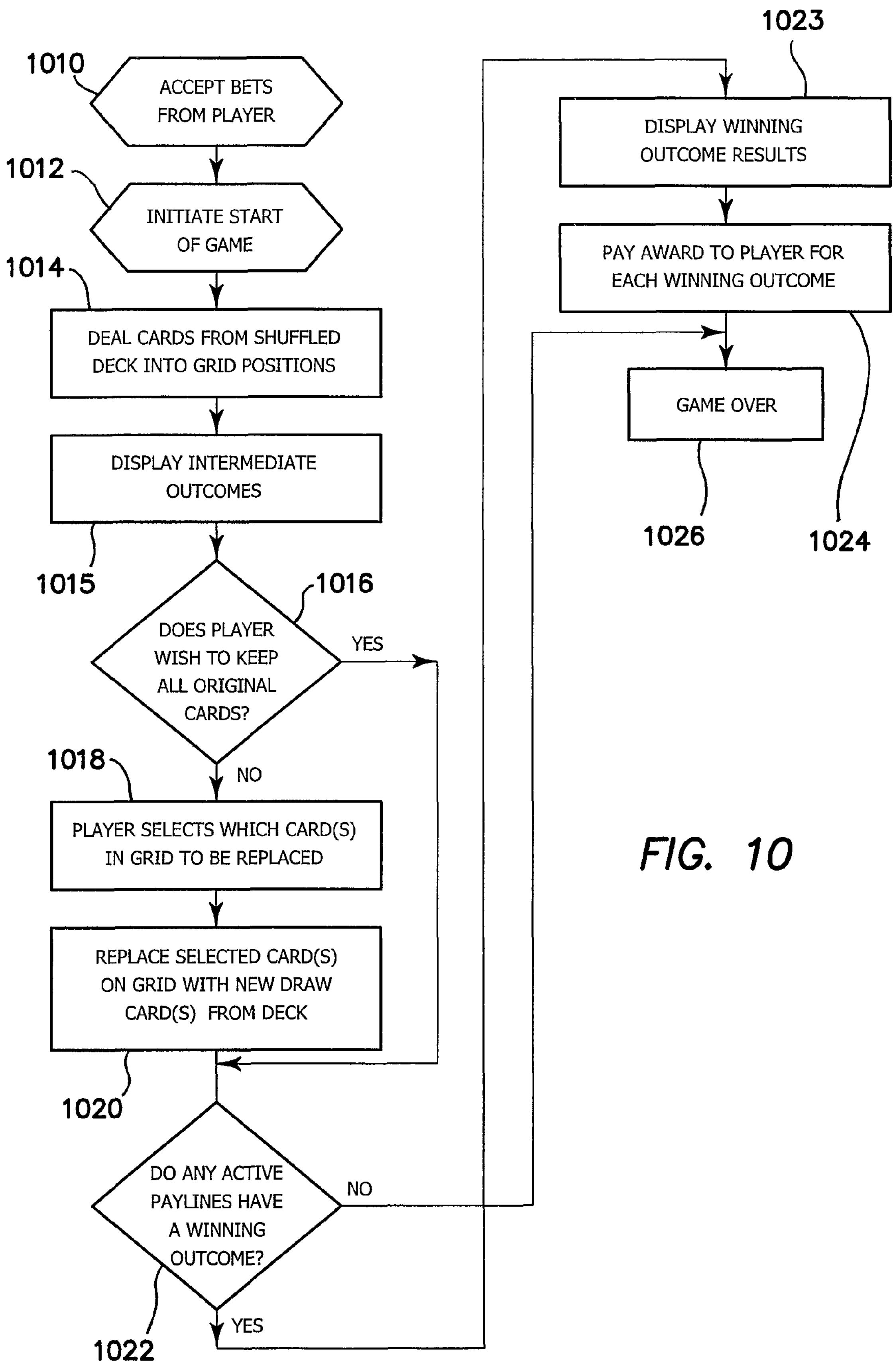
FIG. 10 shows a block diagram of a game having card replacement and outcome display.

FIG. 10 shows a block diagram detailing a third embodiment of the present invention, namely the steps of the block diagram shown in FIG. 8 but with the addition of new outcome display steps. Specifically, after the cards are dealt, displayed or otherwise provided 1014, intermediate game results are displayed 1015. Game results can include, but are not limited to, identification of any winning outcomes, indication of the value of any winning outcomes, indication of which cards, if any, are essential to a winning outcome, indication of which pay lines might become winning outcomes with the replacement of the remaining available card(+ etc. Displaying the intermediate game results makes it easier for the player to decide which card(s) to select for replacement. For example, indicating which cards are essential to a winning outcome helps the player more quickly identify which cards are suitable candidates for replacement. The block diagram of FIG. 10 also includes a similar results display step 1023 during the outcome evaluation 1022 and award payment 1024 phase of the game, whereby the type and award amounts, for example, may be displayed. This embodiment of the invention may be more readily implemented as a video game or Internet-based game. However, a programmed electromechanical device, having knowledge of the card values in each card position, implemented with a live table game may likewise display similar data.

Figure 11:
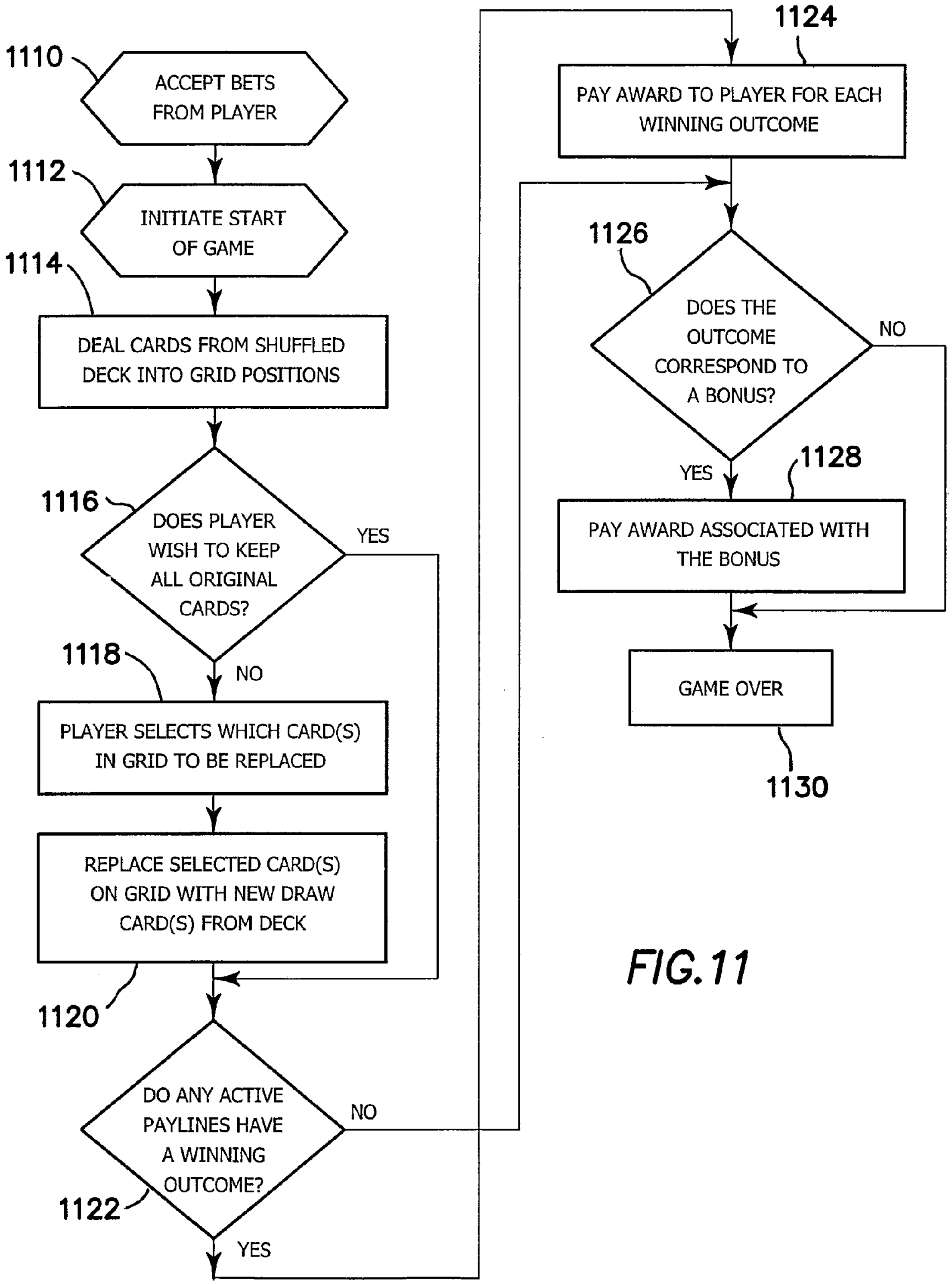
FIG. 11 shows a block diagram of a game with a bonus.

FIG. 11 shows a block diagram detailing a fourth embodiment of the present invention, namely the steps of the block diagram shown in FIG. 8 but with the addition of bonus pay steps. Specifically, in addition to evaluating 1122 and paying awards 1124 based on each pay line outcome, a bonus-triggering outcome may be evaluated 1126 and, if present, a bonus is paid 1128. An example of such a bonus is referenced in FIG. 7 which describes a "9 Card Bonus/Straight Flush 100,000/Flush 10,000." Consequently, there is a bonus paid in response to all nine cards forming a flush or straight flush.

Game rules may require certain wagering requirements for a player to be eligible for a bonus. For example, the player may be required to place a wager equivalent to, or exceeding a minimum amount. An alternate embodiment may involve a variable sized award and/or the playing of a secondary bonus event to produce the bonus payment. For example, a bonus-triggering event may cause additional cards to be dealt according to some additional rules that determine the size of the bonus award. In another example, a bonus-triggering event may cause a bonus event to occur that uses a different mechanism than main game cards to determine the bonus award to be paid.

Figure 12:
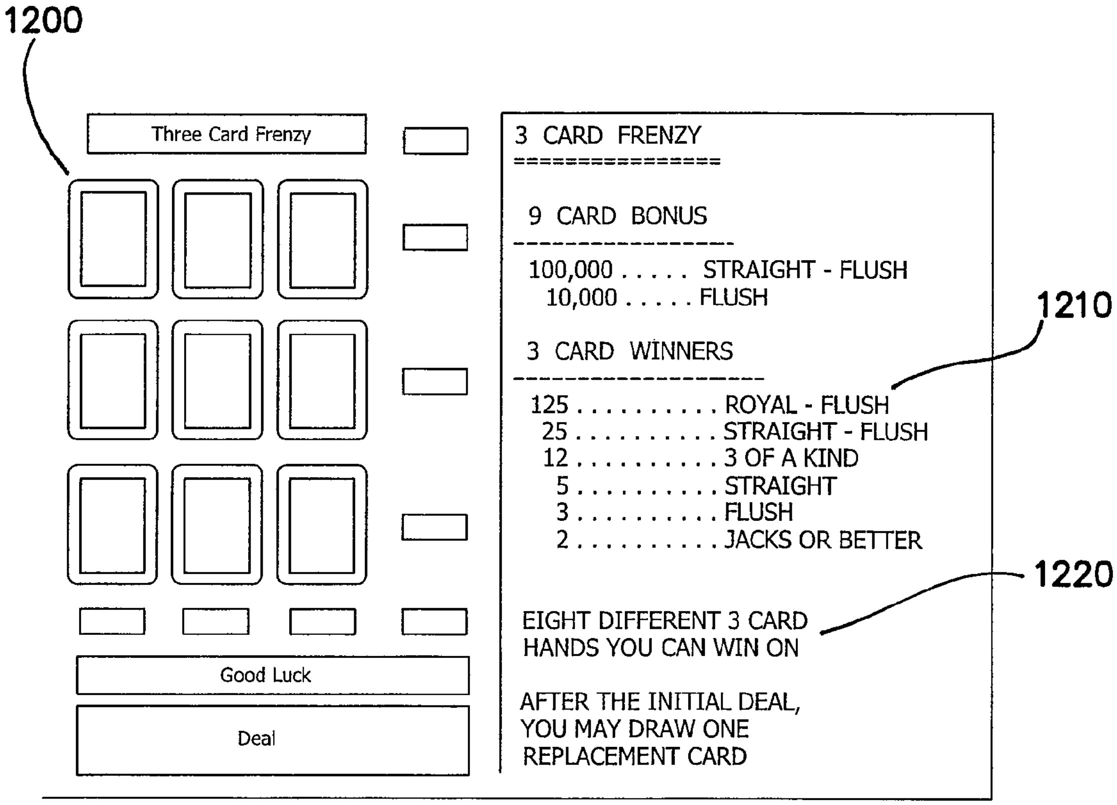
FIG. 12 shows a sample game state, namely awaiting a start of the game.

Similar to FIG. 7, FIG. 12 depicts a screen shot from an example of the game implemented as a video game or Internet-based game. It consists of a 3×3 grid of card positions 1200, pay table information 1210 and certain game rules 1220. Unlike FIG. 7, FIG. 12 depicts a pure video game implementation. FIG. 12 shows the state of the game with the player being prompted to initiate play.

Figure 13:
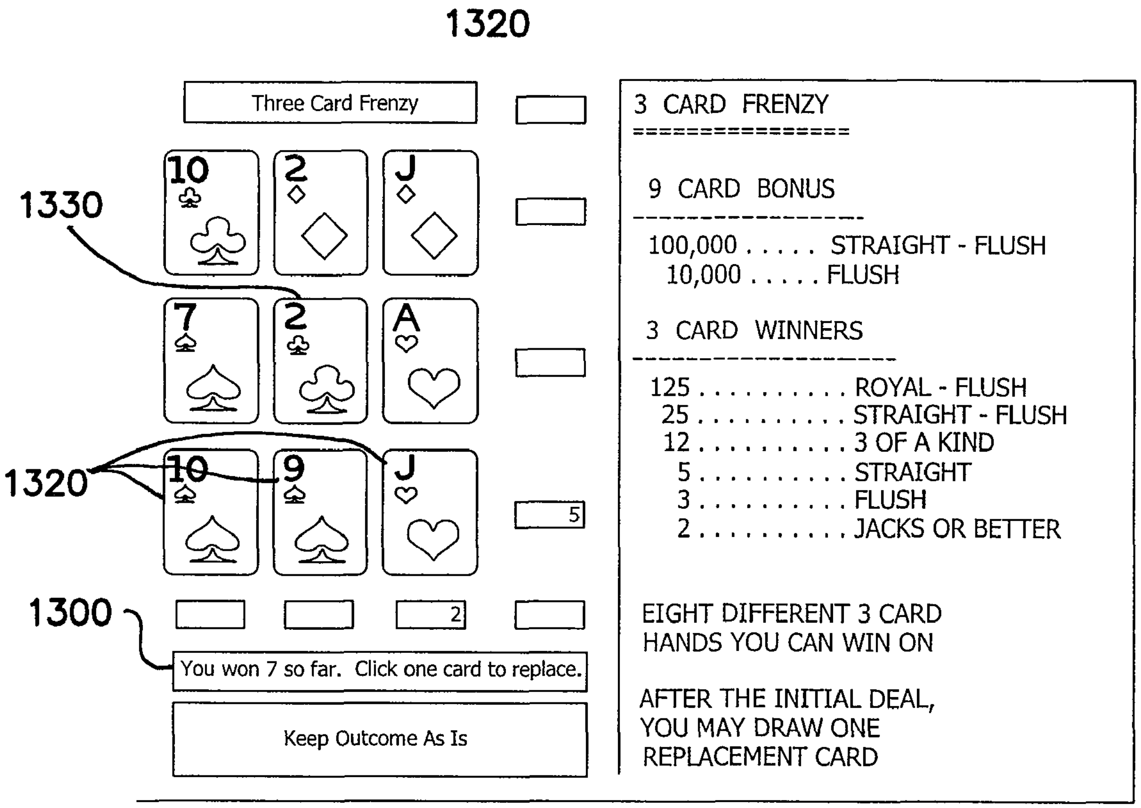
FIG. 13 shows a sample game state, namely awaiting a player to select a card to be replaced.

FIG. 13 is another screen shot similar to FIG. 12 but depicting a different game state, namely the state after initial cards have been displayed, intermediate results have been displayed 1300 and the player is prompted to select a replacement card or forgo such a replacement and hold all cards. This state corresponds to steps 1016 and 1018 from FIG. 10. As with FIG. 10, the screen shot depicts the display of intermediate results including the award amounts associated with each pay line that currently define a winning outcome and the highlighting of cards 1320 that currently form a winning outcome. An alternate implementation may, in addition to the payout, indicate the type of winning outcome, such as "Straight" or "High Pair" for each appropriate pay line.

Figure 14:
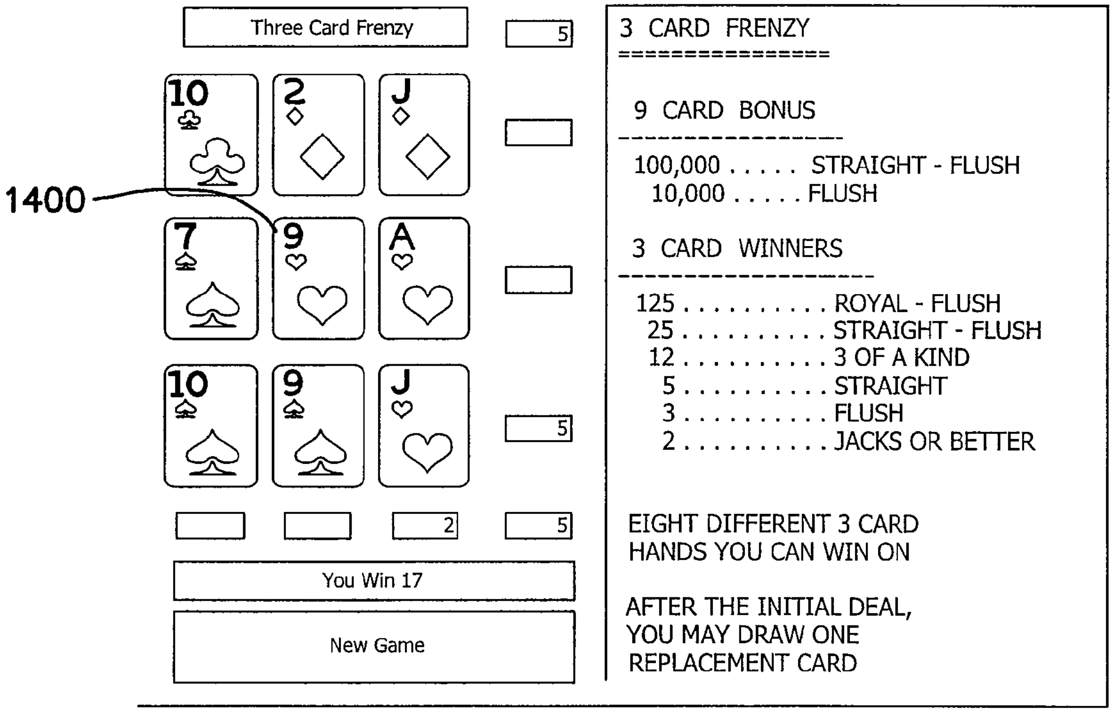
FIG. 14 shows a sample game state, namely a game completed.

FIG. 14 is another screen shot similar to FIG. 13 but depicting a different game state, namely the state after the draw card has been displayed and the outcome finalized. Specifically, the center card (2♣) 1330 from FIG. 13 has been selected and replaced with a new center card (9♥) 1400. Replacing the 2♣ with the 9♥ increases the number of winning pay lines and corresponding payout.

Figure 15:
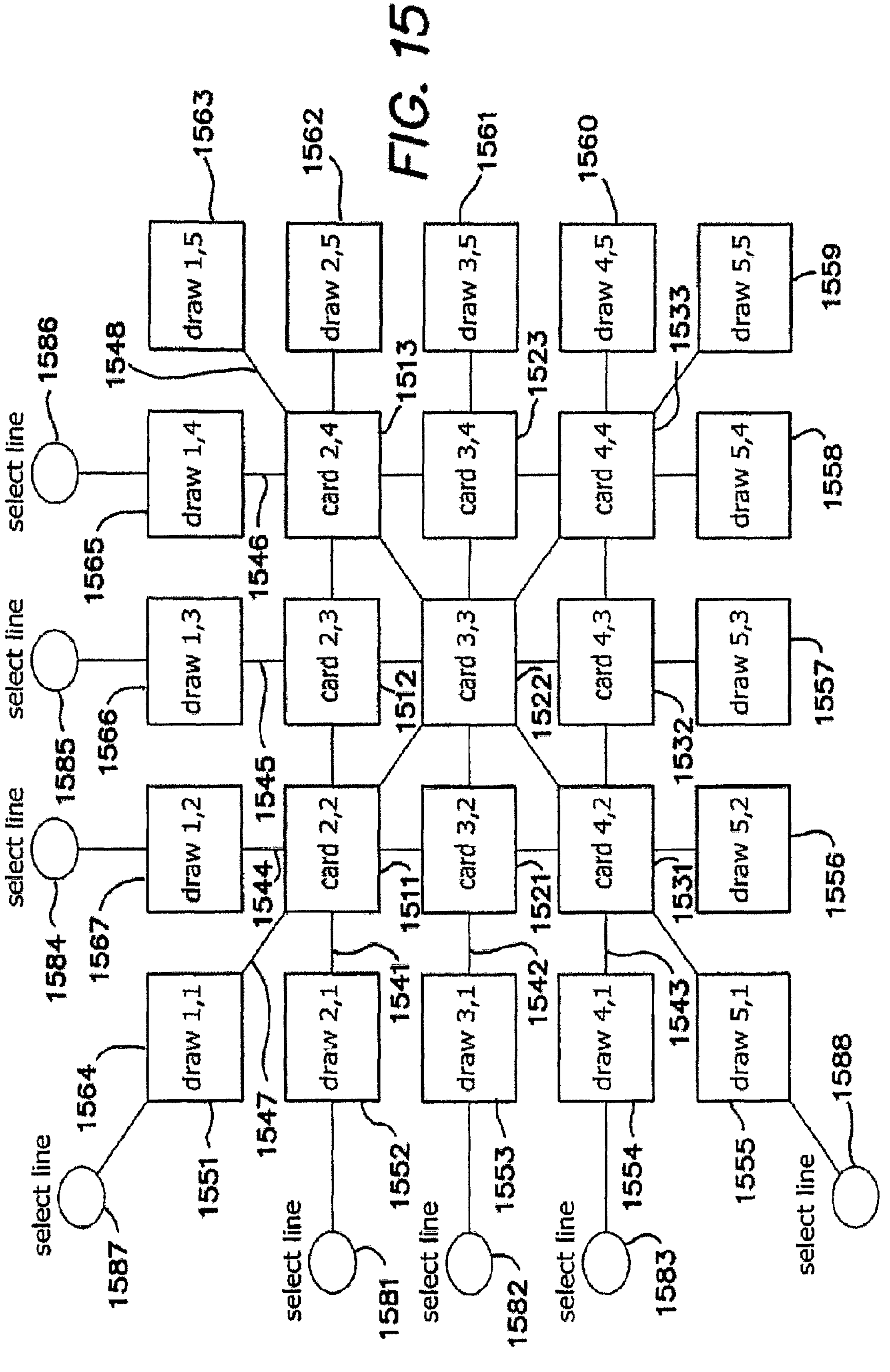
FIG. 15 shows a game having selectable pay lines.

FIG. 15 shows a fifth embodiment of the present invention wherein the card positions into which the draw cards are to be displayed are empty after the initial deal. The initial cards are dealt, displayed or otherwise provided to the center 3×3 grid comprising card positions 1511-1513, 1521-1523, 1531-1533. Eight pay lines, including three horizontal pay lines 1541-1543, three vertical pay lines 1544-1546 and two diagonal pay lines 1547-1548 intersect the card positions 1511-1513, 1521-1523, 1531-1533. Also, associated with each pay line 1541-1548 are two separate draw card positions 1551-1564. For example, pay line 1541 has draw card positions 1552 and 1562 for receiving draw cards 2,1 and 2,5 respectively. At an end of each pay line 1541-1548 is a selector spot 1581-1588 which the player uses after the initial display of cards to indicate the pay line(s) he wishes to select. The draw cards are then displayed to the draw card positions 1551-1564 associated with the selected pay line. A game can be defined such that the player only selects one pay line or multiple pay lines.

Figure 16:
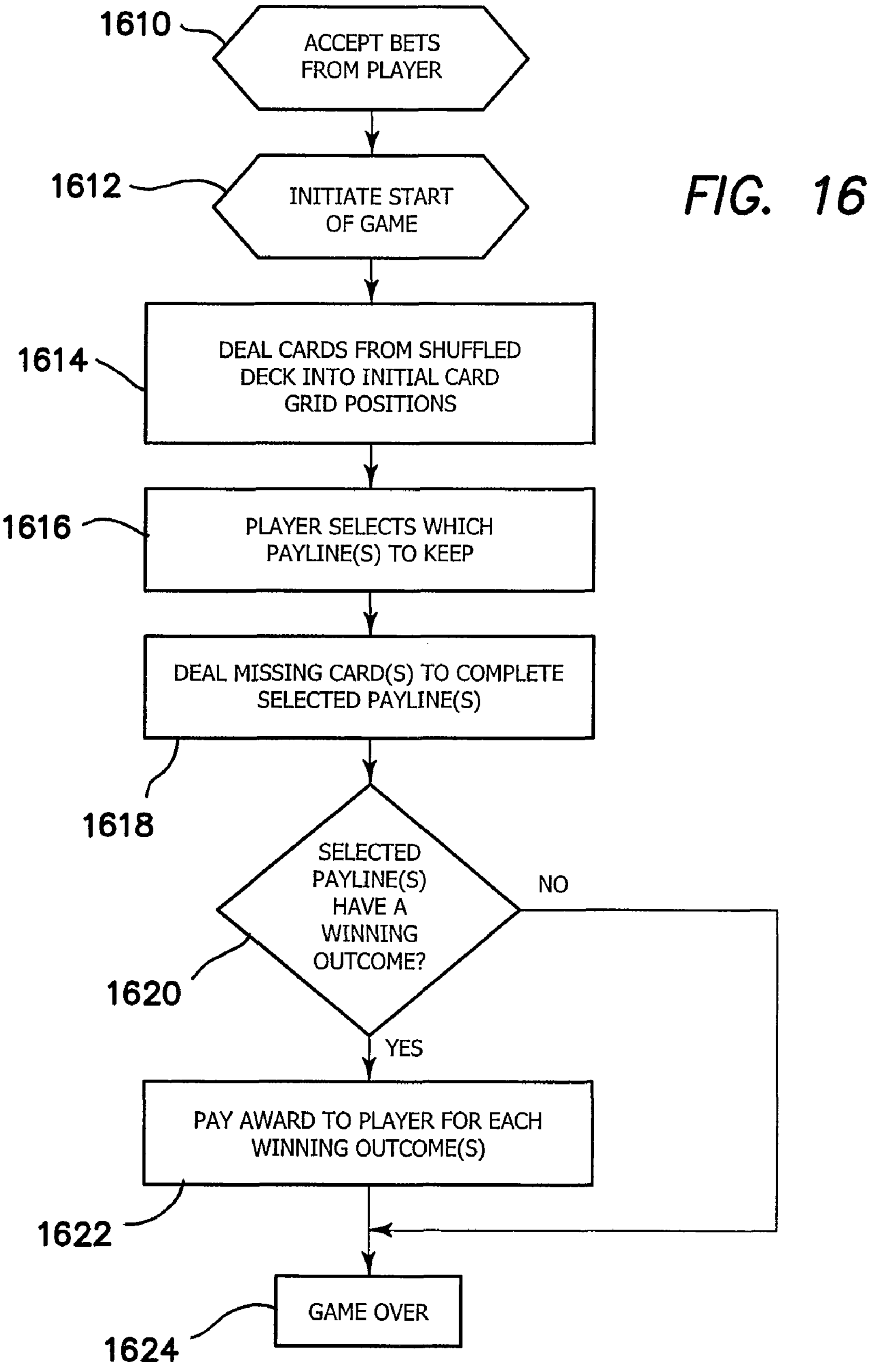
FIG. 16 shows a block diagram of a game having selectable pay lines.

FIG. 16 shows a block diagram of the fifth embodiment of the present invention corresponding to the game shown in FIG. 15. Player wagers are accepted 1610, the game is started 1612 and the initial cards are displayed 1614 into card positions. The player then selects K pay lines 1616, where K is defined by the games rules to be an integer value between one and number less than the number of total pay lines. For each selected pay line, the corresponding draw card positions are filled 1618 with card(s) dealt from the deck. For each selected pay line, the corresponding intersected cards are evaluated to determine whether they correspond to a winning outcome 1620 and for each winning outcome, the player is paid 1622 based on the rules of the game.

Although the invention has been described in detail with reference to several embodiments, additional variations and modifications exist within the scope and spirit of the invention as described and defined in the following claims.

The invention is claimed as follows:

1. A gaming device comprising:

a display device;

an input device;

a processor; and a memory device which stores:

(i) data representing:

(a) a plurality of playing cards configured to fill a three by three matrix of card positions; and (b) a plurality of different wager options, each one of the wager options corresponding to a position set of at least three of the card positions; and (ii) a plurality of instructions, which when executed by the processor, cause the processor to operate with the display device and the input device, for each play of a game, to:

(a) receive a first input from a player corresponding to a single wager for the play of the game;

(b) activate a plurality of the position sets based on the first input;

(c) display one of the playing cards at each one of the card positions of the activated position sets;

(d) receive a second input from the player corresponding to a replacement of one of the displayed playing cards;

(e) limit the replacement to a single one of the displayed playing cards during the play, thereby only enabling the player to pick a single one of the displayed playing cards for replacement during the play of the game;

(f) display one of the playing cards in place of the replaced playing card;

(g) determine whether a plurality of the displayed playing cards at one of the position sets corresponds to a winning combination; and (h) indicate an award in response to an occurrence of the winning combination.

2. The gaming device of claim 1, which includes a quantity of the position sets, and wherein the memory device stores instructions which are executable by the processor to allocate a portion of the single wager to each one of the position sets, the portion being equal to the single wager divided by the quantity of position sets.

3. The gaming device of claim 1, wherein the memory device stores instructions which are executable by the processor to activate all of the position sets based on the first input.

4. The gaming device of claim 1, wherein the memory device stores instructions which are executable by the processor to cause the display device to display the three by three matrix of card positions.

5. The gaming device of claim 1, wherein each one of the position sets corresponds to a payline.

6. The gaming device of claim 1, wherein the winning combination is based on at least one of: (a) three of the displayed playing cards at one of the position sets; and (b) four or more of the displayed playing cards at a plurality of the position sets.

7. A method of operating a gaming device including a memory device, a processor, an input device and a display device, said memory device storing data representing:

(i) a plurality of playing cards configured to fill a three by three matrix of card positions, and (ii) a plurality of different wagering options, each one of the wagering options corresponding to a position set of at least three of the card positions;

said method, for each play of a game, comprising:

(a) receiving via the input device a first input from a player corresponding to a single wager for the play of the game;

(b) causing the processor to execute the plurality of instructions to activate a plurality of the position sets based on the first input;

(c) causing the display device to display one of the playing cards at each one of the card positions of the activated position sets;

(d) receiving via the input device a second input from the player corresponding to a replacement of one of the displayed playing cards;

(e) causing the processor to execute the plurality of instructions to limit the replacement to a single one of the displayed playing cards during the play of the game, thereby only enabling the player to pick a single one of the displayed playing cards for replacement during the play of the game;

(f) causing the display device to display one of the playing cards in place of the replaced playing card;

(g) causing the processor to execute the plurality of instructions to determine whether a plurality of the displayed playing cards at one of the position sets corresponds to a winning combination; and (h) causing the display device to indicate an award in response to an occurrence of the winning combination.

8. The method of claim 7, wherein the memory device to stores data representing a quantity of the position sets; and which includes causing the processor to execute the plurality of instructions to allocate a portion of the single wager to each one of the position sets, the portion being equal to the single wager divided by the quantity of position sets.

9. The method of claim 7, which includes causing the processor to execute the plurality of instructions to activate all of the position sets based on the first input.

10. The method of claim 7, which includes causing the display device to display the three by three matrix of card positions.

11. The method of claim 7, which includes causing the processor to execute the plurality of instructions to associate each one of the position sets with a payline.

12. The method of claim 7, wherein the winning combination is based on at least one of: (a) three of the displayed playing cards at one of the position sets; and (b) four or more of the displayed playing cards at a plurality of the position sets.

* * * * *

UNITED STATES PATENT AND TRADEMARK OFFICE

CERTIFICATE OF CORRECTION

PATENT NO. : 7,862,417 B2
APPLICATION NO. : 12/569199
DATED : January 4, 2011
INVENTOR(S) : Mark C. Nicely It is certified that error appears in the above-identified patent and that said Letters Patent is hereby corrected as shown below:

In Claim 7, Column 8, Line 51, after "positions;" insert --and--.

In Claim 8, Column 9, Lines 14 to 15, replace "the memory device to stores data" with --the memory device stores data--.

Signed and Sealed this
First Day of March, 2011

David J. Kappos
*Director of the United States Patent and Trademark Office*